Oct. 14, 1958  J. M. SCHMIED  2,855,891
METHOD AND MEANS FOR ICING FOOD PRODUCTS
Filed March 23, 1955  6 Sheets-Sheet 1

INVENTOR
JOSEPH M. SCHMIED

Oct. 14, 1958 J. M. SCHMIED 2,855,891
METHOD AND MEANS FOR ICING FOOD PRODUCTS
Filed March 23, 1955 6 Sheets-Sheet 2

Inventor
JOSEPH M. SCHMIED

Oct. 14, 1958     J. M. SCHMIED     2,855,891
METHOD AND MEANS FOR ICING FOOD PRODUCTS
Filed March 23, 1955     6 Sheets-Sheet 3

Inventor
JOSEPH M. SCHMIED

Oct. 14, 1958 J. M. SCHMIED 2,855,891
METHOD AND MEANS FOR ICING FOOD PRODUCTS
Filed March 23, 1955 6 Sheets-Sheet 4
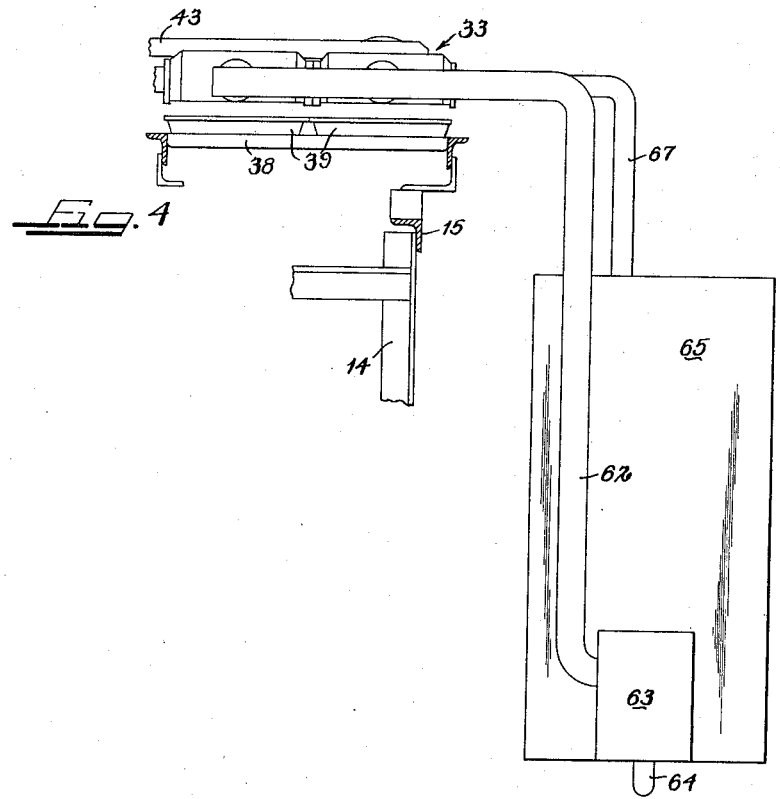
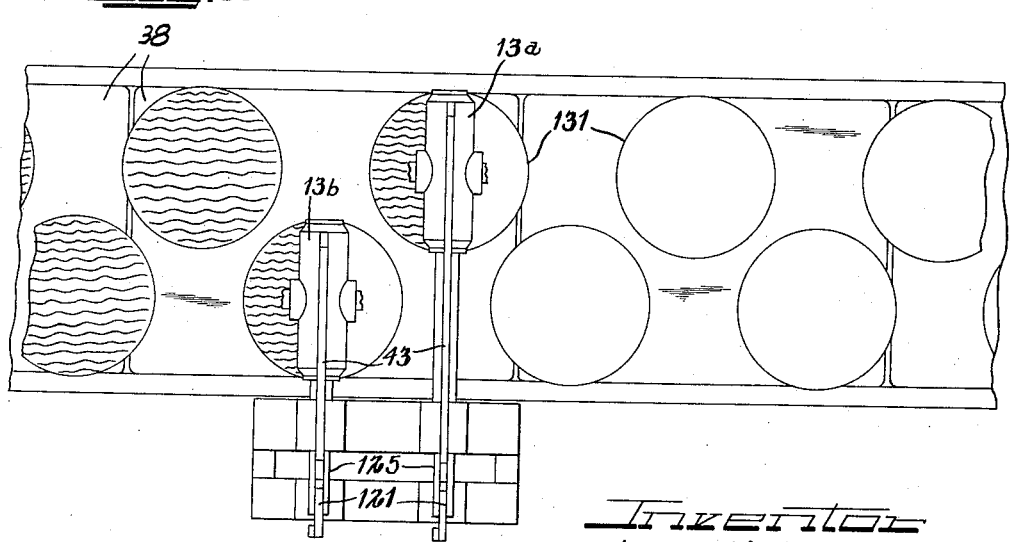
Inventor
JOSEPH M. SCHMIED
Atty.

Oct. 14, 1958 J. M. SCHMIED 2,855,891
METHOD AND MEANS FOR ICING FOOD PRODUCTS
Filed March 23, 1955 6 Sheets-Sheet 5
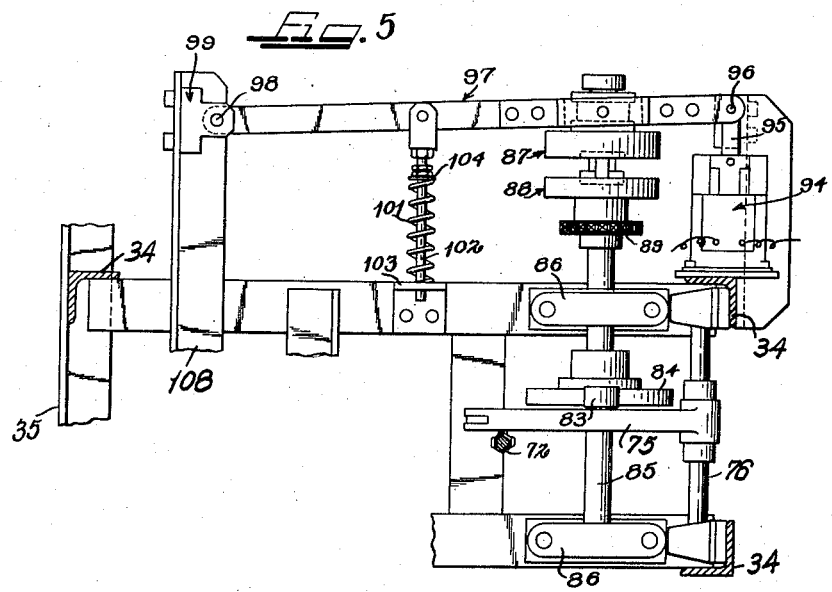
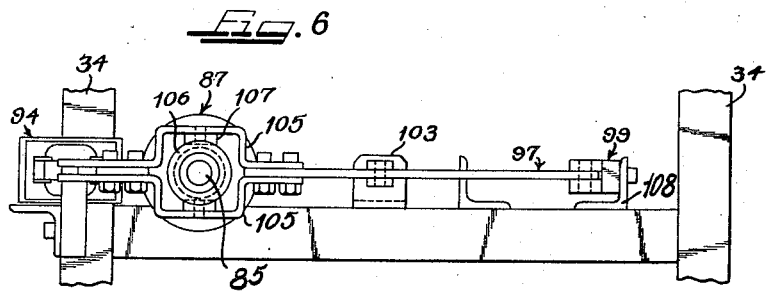
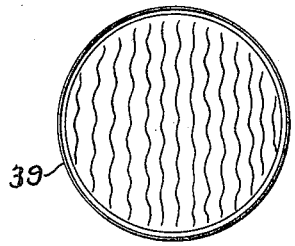
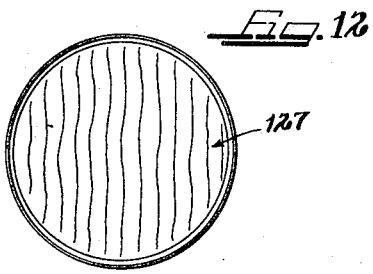
Joseph M. Schmied

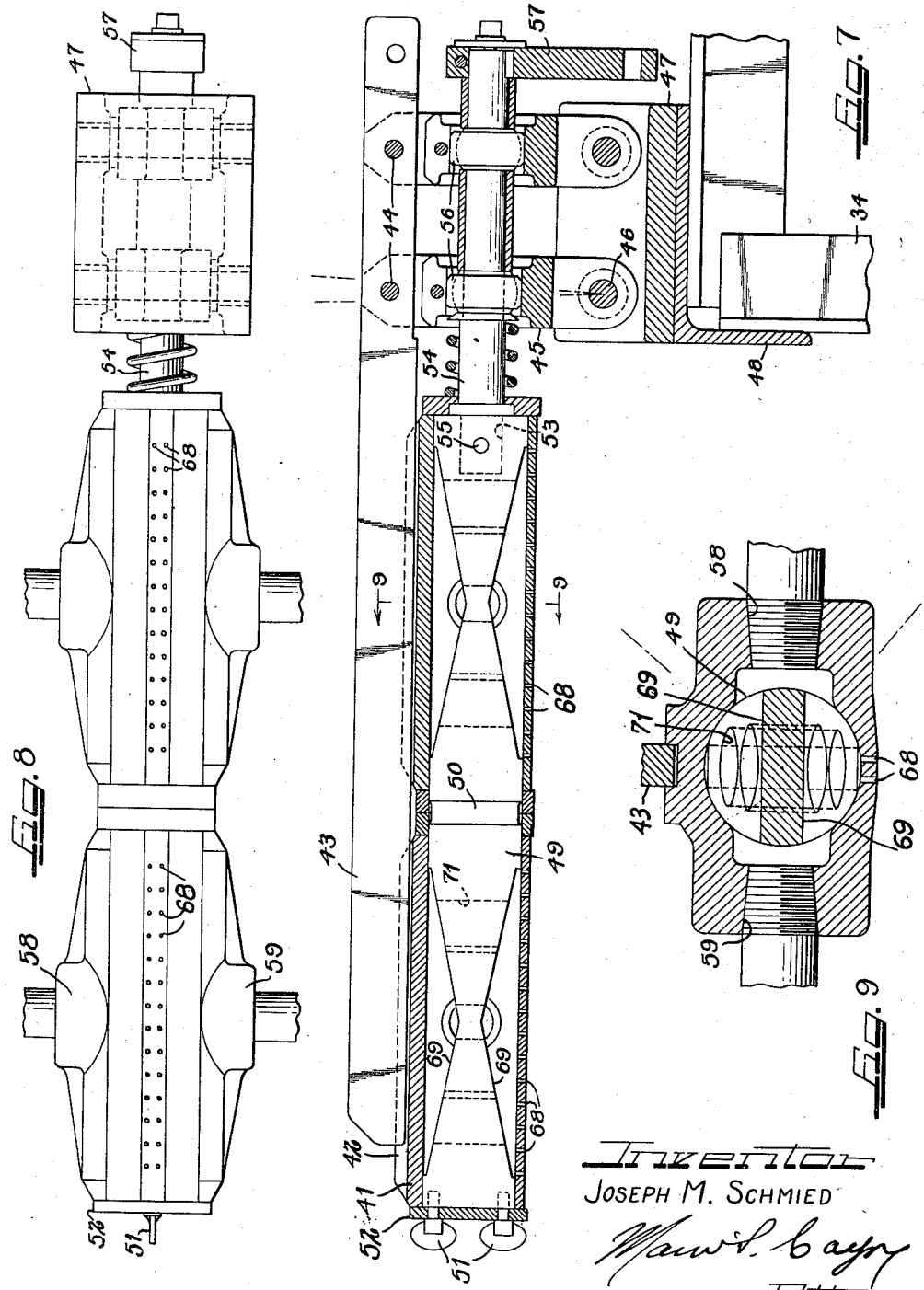

United States Patent Office 2,855,891
Patented Oct. 14, 1958

2,855,891

METHOD AND MEANS FOR ICING FOOD PRODUCTS

Joseph M. Schmied, Chicago, Ill., assignor, by mesne assignments, to Kitchens of Sara Lee, Inc., Chicago, Ill., a corporation of Maryland Application March 23, 1955, Serial No. 496,203

14 Claims. (Cl. 118—2)

The invention relates to improvements in the method and means for supplying and applying a heavy consistency fluid or like substance, such as icing, on bakery goods or other articles and is more particularly concerned with a machine including a novel valve structure, and novel operating mechanism therefor, actuable to deposit in selected predetermined patterns an icing, or the like, on a bakery product.

The invention, in one of its embodiments, is particularly adapted to deposit a plurality of uniformly spaced wavy lines of icing on a bakery product as said product advances at a uniform rate of speed beneath the applying means. The specific applying means disclosed herein consists of a valve structure including a body having rows of vending orifices or openings on one side thereof, and having therein an oscillatably rotatable valve element. Icing is of a nature that sets quickly and should there be any interruption in the flow for any prolonged period, it will cause the vending orifices to become clogged. Such clogging is avoided by the use of the novel valve disclosed herein which is so constructed that icing or other fluid having a heavy consistency is maintained at all times under pressure and it flows freely through the valve and back to its source of supply even when the vending orifices are closed. Because of the presence of uniform pressure within the valve and due to the specific structure and mode of operation of said valve, any icing that may have tended to become set in the orifices while the valve is momentarily shut off is forcibly ejected instantly following opening of such orifices. It is therefore an object of the present invention to provide a novel machine and apparatus for depositing heavy consistency fluid on bakery products or the like.

It is another object of the invention to provide a novel valve construction for delivering predetermined quantities of such fluid to a bakery product as the latter passes beneath said valve.

Another object is to provide novel means for actuating said valve.

Because it is frequently desired to ice bakery products that are circular in shape, it is essential, to efficient and economical operation of the apparatus, that the valve be constructed to progressively open until the largest area of the product passing therebeneath has reached the area of the vending openings and to then progressively close; the opening and closing being such that the perimeter of the pattern of icing discharged conforms substantially to the circular outline of the product.

It is therefore another object to provide a valve structure that is operable to dispense over an area of predetermined size and shape only.

Another object is to provide an elongated valve structure which includes an oscillatably rotatable valve element and a housing therefor, both of which are longitudinally reciprocable.

Another object is to provide an apparatus of a kind that has an endless stream of products to be iced passing uninterruptedly beneath a dispensing valve structure and common means for conveying the products past said valve and for actuating the valve element.

Another object is to provide novel means for stopping valve operation when no products are positioned therebelow to receive the discharge from said valve were it operated.

Another object is to provide a novel mounting for the valve and its operating mechanism, which mounting may be easily and quickly disassociated from a frame carrying the endless conveyor or other means provided for advancing the products beneath the valve.

Another object is to provide novel means for mounting and oscillating the valve housing.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purposes of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 4 is a transverse sectional view taken substantially on line 4—4 of Fig. 3.

Fig. 5 is a fragmentary horizontal sectional view taken substantially on line 5—5 of Fig. 2.

Fig. 6 is a rear elevational view of the mechanism illustrated in Fig. 5, as viewed on line 6—6 of Fig. 2.

Fig. 7 is a longitudinal central sectional view through the valve structure and its mounting.

Fig. 8 is an inverted plan view of the valve structure shown in Fig. 7.

Fig. 9 is a transverse sectional view of the valve taken substantially on line 9—9 of Fig. 7.

Fig. 10 is a plan view of a product showing the pattern of icing deposited thereon upon operation of the valve structure shown in Fig. 7.

Fig. 12 is a view similar to Fig. 10, but illustrating the pattern of icing obtained when the valve of Fig. 11 is used.

Fig. 13 is illustrative of another adaptation of the present invention.

Figure 1:
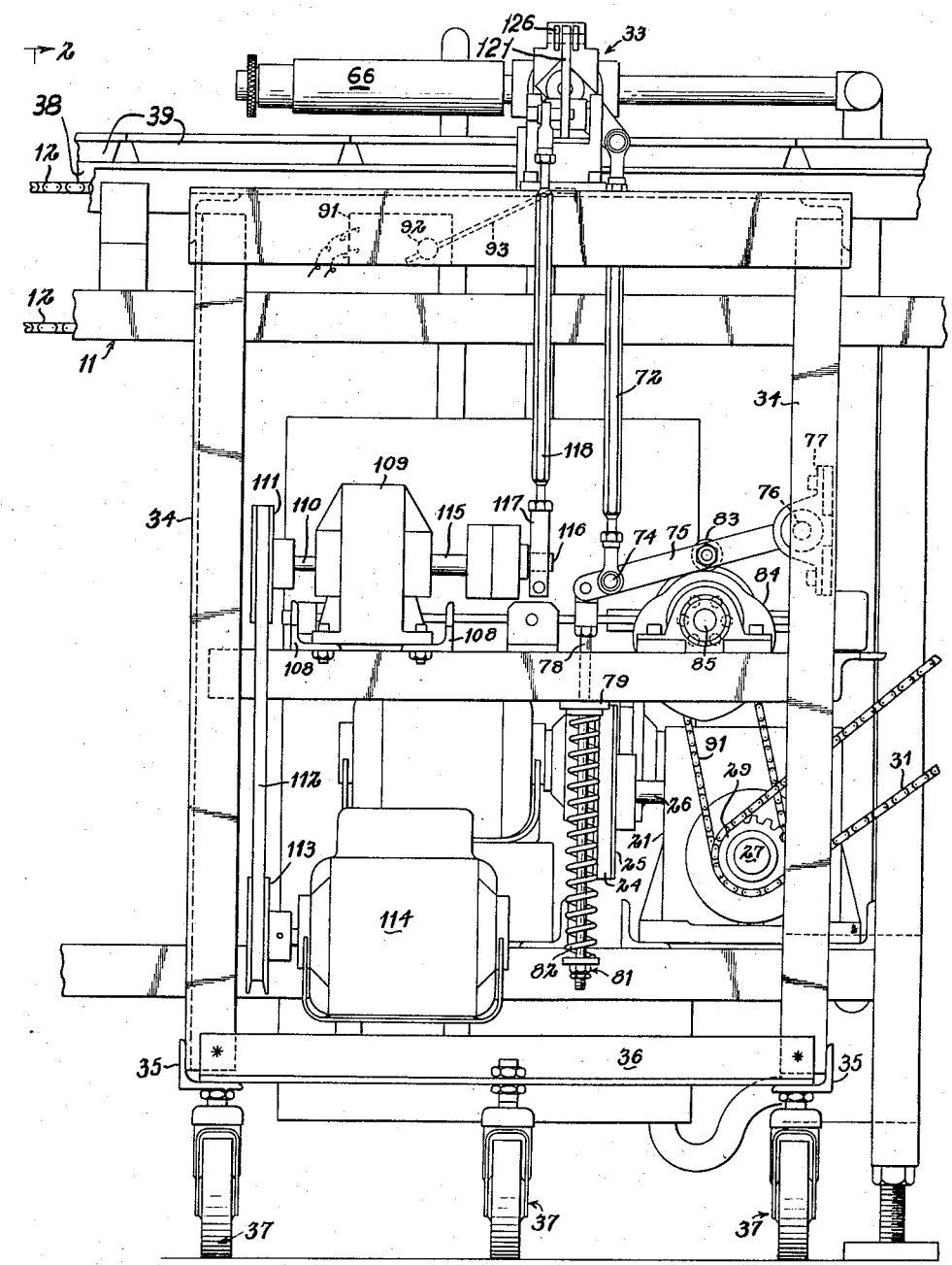
Fig. 1 is a front elevational view of the carriage or frame which supports the valve structure and its operating mechanism, showing portions of the endless conveyor frame in association therewith.

Referring now to the embodiment of the invention as disclosed in Figs. 1 through 10 inclusive, the apparatus includes an endless conveyor frame generally indicated at 11 which carries a movable bed or endless conveyor 12 suitably trained, in a conventional manner, at the ends of said frame over sprockets 13 carried on transverse shafts 13' journaled in the frame 11. The frame 11 may be of any suitable construction, but as illustrated, it preferably includes a plurality of uprights 14 suitably joined transversely, as by angles 15 spot-welded or otherwise secured thereto, and connected along the longitudinal dimension of said frame by stringers 15 and 16, which also are spot-welded or otherwise secured to the uprights 14. Each of the uprights 14 may be provided on its lower end with an adjustable foot 17 so as to afford true horizontal alignment of the conveyor 12 irrespective of any irregularities in the floor or other surface upon which it is placed.

Figure 2:
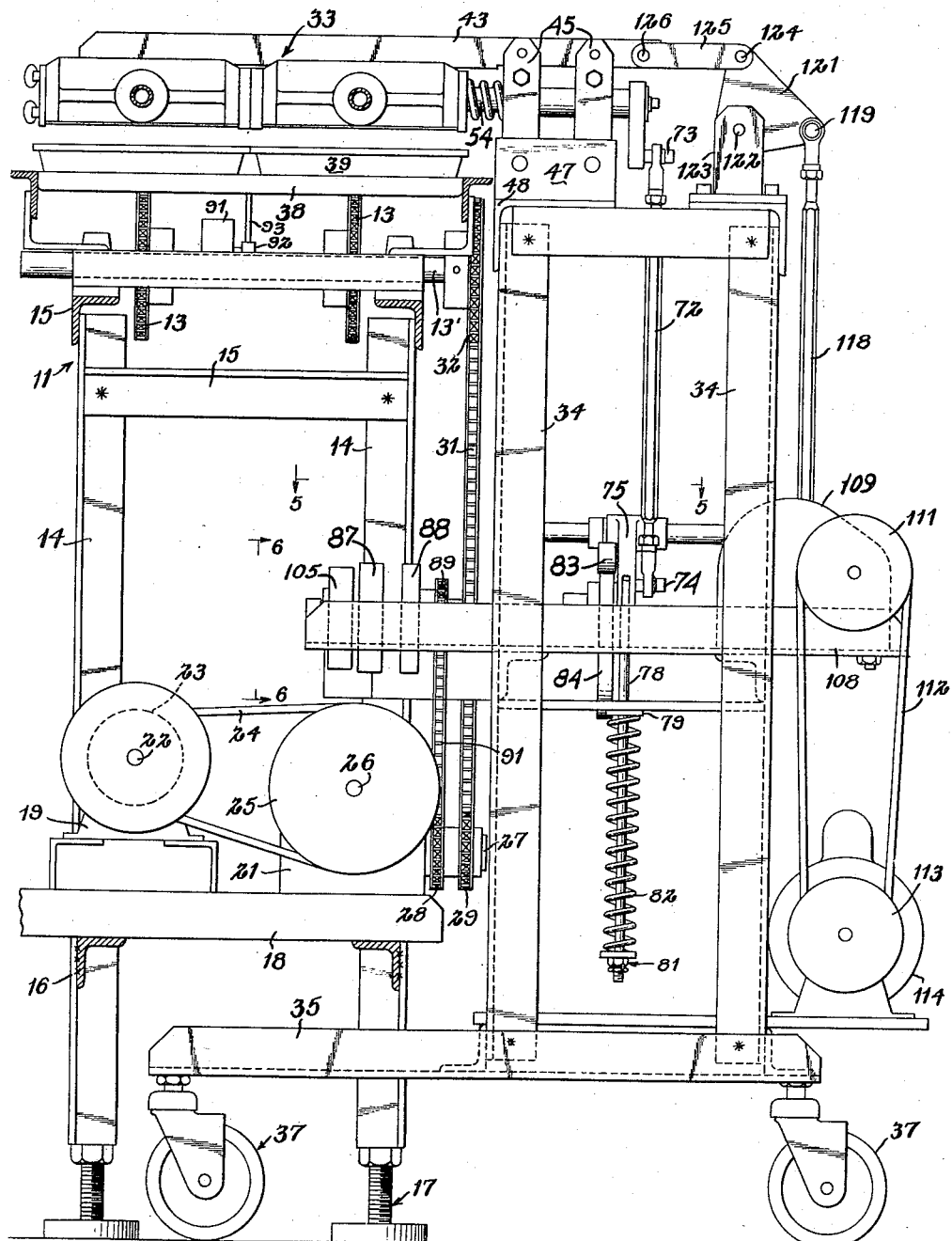
Fig. 2 is a vertical transverse sectional view taken substantially on line 2—2 of Fig. 1.

As is perhaps best illustrated in Figs. 1 and 2, the longitudinal stringers 16 of the conveyor frame support spaced apart transverse angles or like members 18 which constitute a mounting base for a motor 19 and a housing 21 for a conventional gear reduction train. The motor 19 includes a shaft 22 upon which is mounted firmly a pulley 23 over which is trained a drive belt 24 that is also trained over a pulley 25 mounted firmly on a shaft 26 of the gear train. The gear reduction box 21 has extending out of one side thereof, a shaft 27, which carries a pair of sprockets 28 and 29. The sprocket 29 has an endless chain 31 trained thereover, which chain extends upwardly at an angle and is trained over a sprocket 32 secured firmly on one of the conveyor sprocket shafts 13'. The other sprocket 28 on the shaft 27 is provided to afford drive means for actuating a part of the valve assembly to be described presently.

For a purpose to become apparent presently, the valve assembly, generally indicated at 33 in Figs. 1 and 2, is supported upon a separate frame structure which includes four uprights 34 suitably connected at their lower ends by transverse angles 35 and longitudinal angles 36. The rearmost ends of the angles 35 and the intermediate portion of the angle 36 each carry a swivel caster 37, thus adapting the valve supporting frame to be moved into and out of position with respect to the conveyor frame structure 11.

Figure 3:
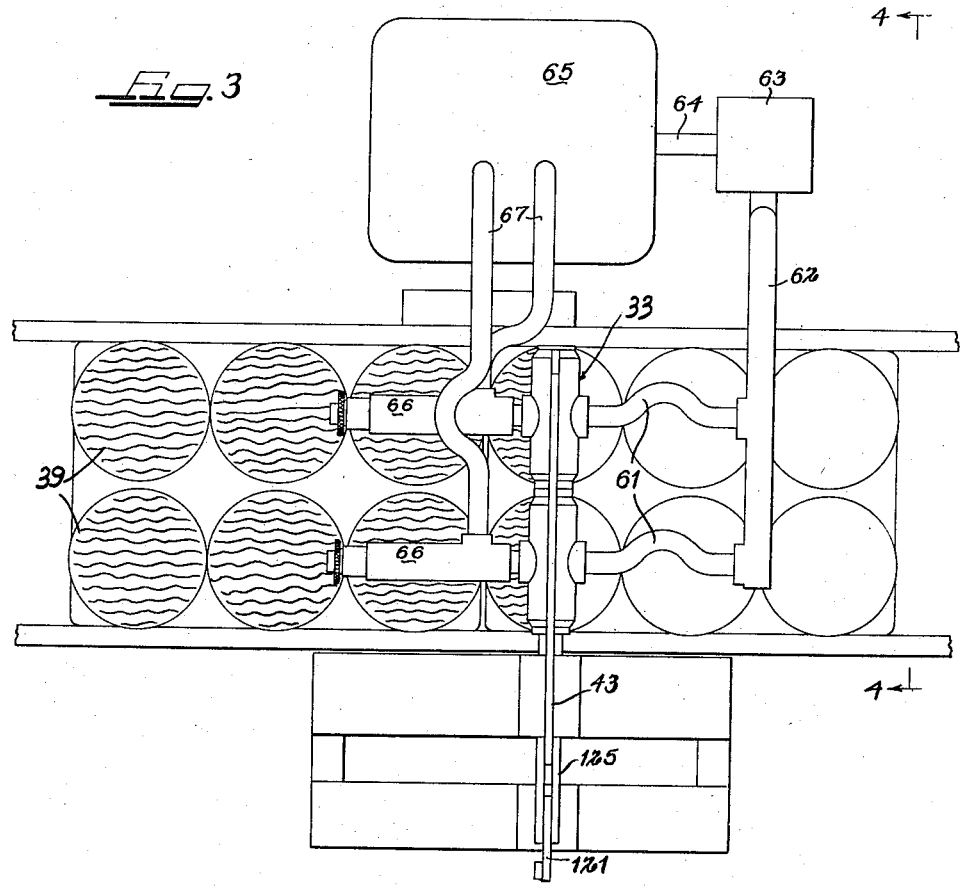
Fig. 3 is a plan view of the vending apparatus and conveyor frame, showing products to be iced in position on the conveyor means.

The valve structure 33 is shown in its relationship to the endless conveyor 12 in Figs. 2 and 3. As there illustrated, said valve extends transversely of the conveyor 12 and is positioned a predetermined distance thereabove so as to allow trays 38 carrying pans 39 containing bakery products or the like to pass therebeneath. The valve, illustrated best in Figs. 7 through 9, includes a horizontally disposed built-up cylindrical housing 41 suitably recessed externally on its upwardly disposed side, as at 42, to receive snugly therein a mounting bar 43. The bar 43 is wedge-fitted, welded, or otherwise secured to the valve housing so as to function as an integral part thereof. The bar 43 extends forwardly of the valve housing and it is suitably journaled at 44 to a pair of parallel brackets 45. These brackets are identical in construction and each is formed substantially U-shaped so as to embrace the bar 43 at their upper ends and the lower ends thereof are each independently pivoted, as by pivot pintles 46, in a U-shaped bracket 47 firmly secured on an angle or the like 48 constituting one of the top rails of the valve supporting frame structure. The purpose and function of this mounting will be explained presently.

Mounted within the cylindrical housing 41 is a valve element 49 (Fig. 7) which in the present disclosure is duplicated so as to permit the vending of icing over two areas simultaneously. Each of the valve elements 49 is identical in construction, and it will be noted that they are interconnected by a body of reduced diameter 50. The rearmost end of the valve element is suitably tapped to receive a plurality of wing screws 51 which firmly secure a retaining plate 52 to valve element 49 so as to rotate therewith. The forward end of the valve element assembly 49 is provided with an axial socket 53 within which is mounted one end of a shaft 54, said shaft being secured in place therein by means of a pin 55 or otherwise. The shaft 54 extends forwardly through each of the movable brackets 45 and is provided with suitable spherical-type journals 56 which cooperate with bearings provided in said brackets to permit oscillatable rocking of the brackets without binding or otherwise impeding free rotation of the shaft 54. The extreme forward end of the shaft 54 carries firmly thereon an arm 57 which provides an operative connection with driving means to be described presently.

The valve structure illustrated in Figs. 7 through 9, in detail, is designed to deposit upon a circular product such as, for example, a coffee cake passing therebeneath, a plurality of wavy lines of icing. Its operation is such that as the product, or the pans containing the product, pass beneath the valve structure, icing is vended from the central area thereof initially and the area of vending progressively widens until the greatest width of the product passes beneath said valve, whereupon the area of icing is progressively reduced and finally cut off as the pan passes out therebeneath. In other words, the pattern of icing conforms to the circular outline of the product.

Inasmuch as the duplex valve assembly illustrated is identical in each of its halves, the following description will refer to but one of said halves and like numerals will identify corresponding parts of the related valve assembly. The valve housing 41 is provided with an inlet 58 and an outlet 59, both communicating with interior of said housing. The inlet 58 is connected (Fig. 3) by means of a flexible conduit 61 to a pipe 62 leading upwardly from a constant pressure pump 63 which receives its supply through a conduit 64 opening into the bottom of a supply container 65. The outlet 59 has connected therewith a pressure regulating valve assembly 66, the construction and operation of which is well understood and consequently is not disclosed in detail. The pressure regulating valve 66 has leading from it a discharge line 67 that returns material pumped through the valve housing 41 to the container 65. This construction and assembly is essential to the successful dispensing of a heavy consistency fluid, such as icing, because were the flow to be interrupted during a shut-off period of the valve, there would be a tendency for the material to set with the ultimate result that the feed lines 61, 62, as well as the valve housing 41, would ultimately become clogged. The presence of pressure regulating valve 66 on the valve assembly enables the operator to control with fine accuracy the pressure under which the material is maintained in the housing 41.

Referring now to the Figs. 7-9, it will be observed that the bottom face of the valve housing 41 is provided with a pair of rows of vending orifices or ports 68. It is through these ports that the icing or other heavy consistency fluid is vended during operation of the apparatus. The amount vended through these ports is determined entirely by the pressure under which the ingredient is maintained within the housing 41. In order to obtain progressive intermittent opening of the vending ports 68, starting with the ports nearest to the center of the valve body, the valve element 49 is suitably cut away on diametrically opposed sides, as at 69, and the wall portion remaining is provided with a plurality of large passages 71 so as to insure equalization of pressure on both sides of the wall portion. Referring particularly to Fig. 9, which shows in full lines the valve element 49 in open position, it will be observed that the housing inlet 58 is in direct communication with the housing outlet 59, while at the same time, the vending ports 68 are open. When the valve is in this position, some of the icing or other heavy consistency fluid flowing through the valve is forcibly ejected through the ports 68 and is deposited on the product therebeneath. When the valve element 49 is rotated from the position illustrated in full lines in Fig. 9 substantially ninety degrees into the position illustrated in dotted lines in said figure, the ports 68 are closed by the wall portion of the valve element. Fluid continues, however, to flow from the valve housing inlet 58 through the passages 71 and out through the outlet 59. There is, therefore, no cessation or interruption of the steady flow of the icing from the supply container 65 through the valve assembly and back to said container.

Owing to the particular manner in which the valve element 49 is cut away at 69, when the valve initially starts to move from its closed position into its open position as shown in Fig. 9, the wall area of less width, midway between the ends of the valve element, constitutes the leading edge for uncovering the ports 68. As the valve element continues its rotation, from the dotted line position into the full line position, the number of ports uncovered is progressively increased until all of said ports are open. As the rotation of the valve is reversed and it returns to its closed position, the ports 68 at the ends of the row of ports are the first to be closed and successive ports are closed until the medial portion of the valve body rests over and closes the centermost ports in the valve body. During the opening and closing of the valve structure, the product to receive the icing or other heavy consistency fluid is moving at a uniform rate of speed therebeneath. The initial opening of the centermost vending ports occurs when the leading edge of the circular product advances beneath the vending ports. As the product continues to advance, the area of said product beneath said ports increases and likewise the number of ports opened is similarly increased until the diametrical center of the product is positioned beneath the fully open valve. At this time, the valve starts its closing operation and the outermost vending ports are initially closed and the next adjacent ports approaching the center are successively closed until all of said ports are cut off from the supply at which time the trailing edge of the circular product passes out from beneath the row of ports 68. It should be quite evident that the valve structure is such that no icing or other heavy consistency fluid is uselessly dispensed or lost inasmuch as it is dispensed only over a product passing therebeneath and, as will become apparent hereinafter, should there be no product passing therebeneath to receive icing or other fluid, the valve will not operate to vend.

Oscillatable rotation of the valve element 49 is obtained through a connecting rod 72, the upper end of which is connected by means of a pin and ball joint 73 to the crank arm 57 on the valve element shaft 54. The connecting rod 72 has its lower end similarly connected, at 74, to a follower arm 75 journaled at 76 in a bearing bracket 77 carried by the valve assembly supporting frame. The extreme free end of the arm 75 has connected to it the upper end of a rod 78 which extends through an opening in a bracket 79 and has, at its lower end, a washer and nut assembly 81. A coiled expansion spring 82 is arranged on the rod 78 between the washer nut assembly 81 and the bracket 79 so as to normally urge the arm 75 downwardly.

The follower arm 75 also carries a roller 83 that rides at all times upon the peripheral surface of an eccentric cam 84 firmly secured on a shaft 85 extending transversely of the frame assembly. Upon referring to Fig. 5, it will be observed that the shaft 85 is journaled in bearings 86 and that it extends rearwardly beyond the rearmost of said journals and carries firmly thereon a clutch element 87 arranged for selective engagement by a companion clutch element 88. The rearwardly projecting end of the shaft 85 also carries loosely a sprocket 89 over which is trained a chain 91 that is also trained over the sprocket 28 on the driven shaft 27.

The sprocket 89 is secured firmly on the hub of the clutch element 88, as is best illustrated in Fig. 5. It should be apparent therefore that the shaft 85 upon which said element is mounted is rotated only when the clutch elements 87 and 88 are in clutching engagement. This engageable drive for the shaft 85, which carries the eccentric 84 for oscillatably rotating the valve element 49, constitutes the means whereby operation of the valve element 49 may be interrupted should there be a gap on the conveyor 12 between the trays 38 carrying the product to be iced. Such interruption in the operation of the valve is accomplished through the provision of a microswitch and solenoid combination. As is perhaps best illustrated in Fig. 1, a microswitch 91 is suitably mounted beneath the upper reaches of the conveyor 12; and it carries, on the projecting end of a switch arm 92, a finger 93 that normally tends to project above the plane of the conveyor 12. However, when there is a continuous unbroken series of pans 38 advancing with the conveyor, the finger 93 is held in a depressed "switch closed" position. Should there be a gap between adjacent trays 38, the finger 93 will spring upwardly into the gap defined thereby thus opening the microswitch 91. The switch is connected by conventional wiring with an electric current supply and with a solenoid 94 (Fig. 5), which solenoid normally is deenergized but which is energized when the microswitch 91 is closed.

Referring now particularly to Figs. 5 and 6, the solenoid 94 includes a core 95 having its free end pivotally connected, as at 96, to the free end of a built-up lever structure 97, the other end of which is pivotally anchored at 98 in a bracket 99 secured firmly to the valve frame assembly. A spring 101 arranged around a guide stem 102 and having its ends bear respectively against a bracket 103 and a washer 104 on said stem, normally tends to urge the lever assembly 97 rearwardly so as to hold the clutch elements 87—88 normally disengaged. When the solenoid 94 is energized upon closing of the microswitch 91, the lever assembly 97 is moved forwardly about its pivot 98 so as to engage the clutch elements 87—88 and thereby operatively connect the cam shaft 85 with the driven sprocket 89.

Although the lever assembly 97 may be constructed in any suitable fashion, it is preferred that it include a substantially rectangular closed yoke 105 that embraces a circumferentially grooved collar 106 forming a part of the clutch element 87. Rollers 107 carried by said yoke 105 are engaged at all times in the grooved collar 106 so as to thereby make the clutch element 87 responsive to movement of the lever assembly 97. It should be apparent at this time that when an unbroken stream of pans 38 moves along the conveyor 12, the solenoid 94 is kept energized, thus holding the clutch elements 87—88 in engagement and insuring positive continuous rotation of the eccentric cam 84 to thereby impart oscillatable rotation through the follower arm 75, connecting rod 72 and valve crank arm 57. This operation is, of course, in timed sequence with the movement of the conveyor inasmuch as both the conveyor 12 and the cam 84 are driven from a common source.

Insofar as the construction has been described, icing, or other heavy consistency fluid, is delivered intermittently through the vending ports 68 of the valve assembly 33 during uninterrupted advance of trays carrying products to be iced. It is desired, however, that the lines of icing deposited on said products assume the form of wavy lines and to this end means is provided to reciprocate the valve assembly 33 longitudinally at all times during machine operation. Such reciprocating movement of the valve assembly 33 is accomplished by the structure best illustrated in Figs. 1, 2, and 7.

Referring now to said figures, the valve supporting frame structure includes forwardly projecting angles 108 which are spaced apart longitudinally of said frame a distance sufficient to afford a mounting for a gear reduction housing 109. A shaft 110 extends outwardly of one end of the gear reduction housing and carries thereon a pulley 111 over which is trained a belt 112 that is also trained over a pulley 113 mounted firmly on the shaft of a motor 114 supported on the lower portion of the supporting frame assembly. The gear reduction box 109 also has, projecting therefrom, a shaft 115 carrying on its end an eccentric 116 upon which is journaled a fixture 117 carried on a lower end of a tie-rod 118. The tie-rod 118 extends upwardly from the fixture 117 and its upper end is pivotally connected, as at 119, to a bell-crank 121 pivotally secured, at 122, on a bracket 123 supported on the valve structure supporting frame assembly. The bell-crank also has connected to it, as at 124, one end of a link 125, the other end of which is pivotally secured, at 126, to the forwardly projecting end of the valve housing supporting bar 43.

During operation of the motor 114, the tie-rod 118 is reciprocated vertically thus imparting reciprocal motion through the bell-crank 121 to the valve assembly 33. This reciprocal action causes longitudinal shifting of the valve assembly 33 and consequently imparts an irregular pattern to any substance being discharged from the vending ports 68. It is in this manner that the icing or other heavy consistency fluid is deposited upon an article or product passing therebeneath in wavy lines. It should be understood, however, that should it be desired to deposit the icing in straight lines, the motor 114 is shut off thus stopping all longitudinal reciprocation of the valve assembly 13.

Figure 11:
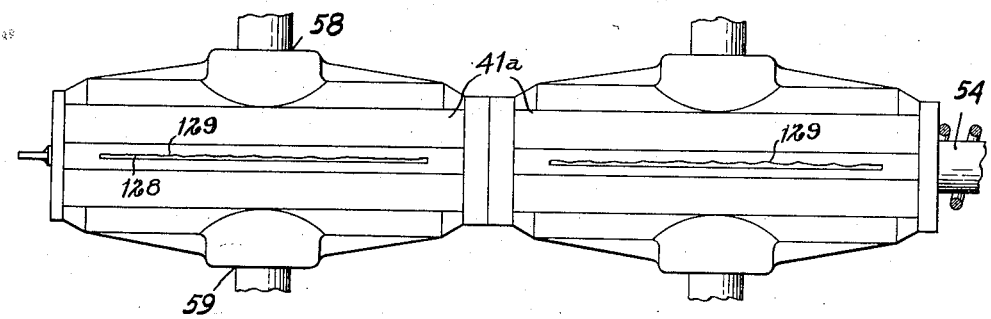
Fig. 11 is a view similar to Fig. 8, showing a modified form of valve structure.

Upon referring to Figs. 11 and 12, it will be observed that there is there disclosed a valve structure which will cause icing, or other heavy consistency fluid, to be deposited upon a product, indicated at 127, in an all-over pattern having irregular ridges thereon. Such a pattern is accomplished by the use of a valve housing 41a, which is provided on its underface with continuous slots 128, one edge 129 of which is serrated or otherwise made irregular. The valve assembly is otherwise like that previously described and it may be reciprocated longitudinally or held stationary as desired.

In the foregoing description, the valve structures have been of a kind that deposit icing, or other heavy consistency fluid, upon parallel rows of products passing therebeneath. It sometimes occurs that the diameter or width of the product is such that two products cannot be moved along the conveyor in transverse alignment. Such a situation is illustrated in Fig. 13, where the products 131 are of such size that they must be staggered along the conveyor. In this event, it is necessary to provide two independent valve assemblies 13a and 13b, one arranged in advance of the other but both of which are suitably connected to eccentrics and connecting rods so that the valves as a whole may be reciprocated longitudinally and the valve elements therein may be oscillatably rotated in timed sequence. As illustrated, the products 131 in each longitudinal line are spaced uniformly apart and consequently the operation of the oscillatably rotatable valve element in each valve is timed so that said valve will remain closed during the interval when a gap between succeeding products is passing therebeneath. Other adaptations of the present invention are readily apparent, and it is to be understood that although circular products are illustrated, the valve structure and the timing of the operation thereof can be altered to accommodate articles of other sizes and shapes.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. An apparatus for depositing a viscous fluid on products over an area of predetermined configuration of each product, said apparatus comprising a valve assembly, conveyor means for conveying said products in spaced succession in a path extending below said valve assembly, said valve assembly comprising a hollow housing having a substantially cylindrical interior surface, said housing having a longitudinal axis extending in a direction transversely to said path, a cylindrical valve element within the housing and coaxially of the latter, the external diameter of said valve element being approximately equal to the internal diameter of said housing so as to provide a substantially sealing engagement between the exterior cylindrical surface of the element and the interior surface of the housing, discharge orifice means communicating between the interior and exterior of the housing and extending longitudinally along the bottom thereof in a direction parallel to the axis thereof, said valve element having a longitudinal recess in the exterior surface thereof, said recess having a length at least equal to the length of said discharge orifice means, said recess extending in a direction transverse to its length segmentally through said cylindrical valve element, the depth of said recess in the direction radially of said valve element varying along the length of said recess, said element being mounted for rotary movement about its axis to various predetermined open positions in which said recess communicates with various respective predetermined portions of said discharge orifice means so as to vary the length of the portion thereof in communication with said recess and also to a closed position in which said discharge orifice means is out of communication with said recess and is entirely closed by the cylindrical surface of said element, said housing having an inlet opening and an outlet opening for said viscous fluid, said openings communicating through said recess with each other and with said discharge orifice means when said valve element is in said open positions, said valve element having conduit means extending transversely therethrough and communicating with both of said openings at least during the period when said valve element is in a closed position, means for actuating said valve element through a complete cycle of movement including said various positions thereof in timed relation to the passage of each of said successive products below the valve assembly, and means for forcing said viscous fluid into said inlet opening and through said housing and out of said outlet opening continuously without interruption during a plurality of successive cycles of movement of said valve element.

2. An apparatus as recited in claim 1 wherein said discharge orifice means comprises a plurality of discharge openings each adapted to discharge the fluid in a thin stream, means for mounting said valve housing for reciprocating movement in the direction of its longitudinal axis, and means for reciprocating said housing for causing each of said discharged streams of fluid to be deposited on the product in the form of a wavy line.

3. An apparatus as recited in claim 1 wherein said valve element is provided with a second recess in the exterior surface thereof, the area of said second recess being substantially equal to the area of said first-recited recess, said second recess being diametrically opposite said first recited recess, whereby the radial thrust exerted on the valve element in any radial direction by the fluid pressure will be equal to and counterbalanced by a radial thrust in the opposite direction so as to prevent the fluid pressure from forcing the exterior surface of the valve element against the interior surface of the housing.

4. A valve assembly for depositing a viscous fluid on products over an area of predetermined configuration of each product, said valve assembly comprising a hollow housing having a substantially cylindrical interior surface, said housing having a longitudinal axis extending approximately horizontally and a cylindrical valve element within the housing and coaxially of the latter, discharge orifice means communicating between the interior and exterior of the housing and extending longitudinally along the bottom thereof in a direction parallel to the axis thereof, said valve element having a longitudinal recess in the exterior surface thereof, said recess having a length at least equal to the length of said discharge orifice means, said recess extending in a direction transverse to its length segmentally through said cylindrical valve element, the depth of said recess in the direction radially of said valve element varying along the length of said recess, said element being mounted for rotary movement about its axis to various predetermined open positions in which said recess communicates with various respective predetermined portions of said discharge orifice means so as to vary the length of the portion thereof in communication with said recess and also to a closed position in which said discharge orifice means is out of communication with said recess and is entirely closed by the cylindrical surface of said element, said housing having an inlet opening and an outlet opening for said viscous fluid, said openings communicating with said discharge orifice means through said recess when said valve element is in an open position.

5. A valve assembly as recited in claim 4 wherein said discharge orifice means comprises a plurality of discharge openings each adapted to discharge the fluid in a thin stream, means for mounting said valve housing for reciprocating movement in the direction of its longitudinal axis, and means for reciprocating said housing for causing each of said discharged streams of fluid to be deposited on the product in the form of a wavy line.

6. A valve assembly as recited in claim 4 wherein said valve element is provided with a second recess in the exterior surface thereof, the area of said second recess being substantially equal to the area of said first recited recess, said second recess being diametrically opposite said first recited recess, whereby the radial thrust exerted on the valve element in any radial direction by the fluid pressure will be equal to and counterbalanced by a radial thrust in the opposite direction so as to prevent the fluid pressure from forcing the exterior surface of the valve element against the interior surface of the housing.

7. An apparatus for depositing a viscous fluid on products over an area of predetermined configuration of each product, said apparatus comprising a valve assembly, said valve assembly comprising a hollow housing having a substantially cylindrical interior surface, a cylindrical valve element within the housing and coaxially of the latter, the external diameter of said valve element being approximately equal to the internal diameter of said housing so as to provide a substantially sealing engagement between the exterior cylindrical surface of the element and the interior surface of the housing, discharge orifice means communicating between the interior and exterior of the housing and extending longitudinally along the bottom thereof in a direction parallel to the axis thereof, said valve element having a longitudinal recess in the exterior surface thereof, said recess having a length at least equal to the length of said discharge orifice means, said recess extending in a direction transverse to its length segmentally through said cylindrical valve element, the depth of said recess in the direction radially of said valve element varying along the length of said recess, said element being mounted for rotary movement about its axis to various predetermined open positions in which said recess communicates with various respective predetermined portions of said discharge orifice means so as to vary the length of the portion thereof in communication with said recess and also to a closed position in which said discharge orifice means is out of communication with said recess and is entirely closed by the cylindrical surface of said element, said housing having an inlet opening and an outlet opening for said viscous fluid, said openings communicating through said recess with each other and with said discharge orifice means when said valve element is in said open positions, said valve element having conduit means extending transversely therethrough and communicating with both of said openings at least during the period when said valve element is in a closed position, and means for forcing said viscous fluid into said inlet opening and through said housing and out of said outlet opening continuously without interruption when said valve element is in its closed and open positions.

8. An apparatus for depositing a viscous fluid on products over an area of predetermined configuration of each product, said apparatus comprising a valve assembly, conveyor means for conveying said products in spaced succession in a path extending below said valve assembly, said valve assembly comprising a hollow housing having a substantially cylindrical interior surface, said housing having a longitudinal axis extending in a direction transversely to said path, a cylindrical valve element within the housing and coaxially of the latter, discharge orifice means communicating between the interior and exterior of the housing and extending longitudinally along the bottom thereof in a direction parallel to the axis thereof, said valve element having a longitudinal recess in the exterior surface thereof, said recess having a length at least equal to the length of said discharge orifice means, said recess extending in a direction transverse to its length segmentally through said cylindrical valve element, the depth of said recess in the direction radially of said valve element varying along the length of said recess, said element being mounted for rotary movement about its axis to various predetermined open positions in which said recess communicates with various respective predetermined portions of said discharge orifice means so as to vary the length of the portion thereof in communication with said recess and also to a closed position in which said discharge orifice means is out of communication with said recess and is entirely closed by the cylindrical surface of said element, said housing having an inlet opening and an outlet opening for said viscous fluid, said inlet opening communicating with said discharge orifice means through said recess when said valve element is in said open positions, means for actuating said valve element through a complete cycle of movement including said various positions thereof in timed relation to the passage of each of said successive products below the valve assembly, and means for forcing said viscous fluid into said inlet opening and through said housing and out of said outlet opening.

9. An apparatus for depositing a viscous fluid on products over an area of predetermined configuration of each product, said apparatus comprising a valve assembly, conveyor means for conveying said products in spaced succession in a path extending below said valve assembly, said valve assembly comprising a hollow housing having a substantially cylindrical interior surface, said housing having a longitudinal axis extending in a direction transversely to said path, a cylindrical valve element within the housing and coaxially of the latter, the external diameter of said valve element being approximately equal to the internal diameter of said housing so as to provide a substantially sealing engagement between the exterior cylindrical surface of the element and the interior surface of the housing, discharge orifice means communicating between the interior and exterior of the housing and extending longitudinally along the bottom thereof in a direction parallel to the axis thereof, said valve element being mounted for rotary movement about its axis to a closed position and to various predetermined open positions, said valve element having means for opening varying portions of said discharge orifice means in response to movement of said valve element to said various predetermined open positions, said housing having an inlet opening and an outlet opening for said viscous fluid, said openings communicating with each other and with said discharge orifice means when said valve element is in said open positions, said valve element having conduit means extending transversely therethrough and communicating with both of said openings at least during the period when said valve element is in a closed position, means for actuating said valve element through a complete cycle of movement including said various positions thereof in timed relation to the passage of each of said successive products below the valve assembly, and means for forcing said viscous fluid into said inlet opening and through said housing and out of said outlet opening continuously without interruption during a plurality of successive cycles of movement of said valve element.

10. An apparatus as recited in claim 9 wherein said discharge orifice means comprises a plurality of discharge openings each adapted to discharge the fluid in a thin stream, means for mounting said valve housing for horizontal reciprocating movement, and means for reciprocating said housing for causing each of said discharged streams of fluid to be deposited on the product in the form of a wavy line.

11. An apparatus for depositing a viscous fluid on products over an area of predetermined configuration of each product, said apparatus comprising a valve assembly, conveyor means for conveying said products in spaced succession in a path extending below said valve assembly, said valve assembly comprising a hollow housing and a valve element therein, discharge orifice means communicating between the interior and exterior of the housing and extending longitudinally along the bottom thereof, said valve element being mounted for rotary movement to a closed position and to various predetermined open positions, said valve element having means for opening varying portions of said discharge orifice means in response to movement of said valve element to said various predetermined positions, said housing having an inlet opening and an outlet opening for said viscous fluid, said openings communicating with each other and with said discharge orifice means when said valve element is in said open positions, said valve element having conduit means extending therethrough and communicating with both of said openings at least during the period when said valve element is in a closed position, means for actuating said valve element through a complete cycle of movement including said various positions thereof in timed relation to the passage of each of said successive products below the valve assembly, and means for forcing said viscous fluid into said inlet opening and through said housing and out of said outlet opening continuously without interruption during a plurality of successive cycles of movement of said valve element.

12. An apparatus as recited in claim 11 wherein said discharge orifice means comprises a plurality of discharge openings each adapted to discharge the fluid in a thin stream, means for mounting said valve housing for horizontal reciprocating movement, and means for reciprocating said housing for causing each of said discharged streams of fluid to be deposited on the product in the form of a wavy line.

13. An apparatus for depositing a viscous fluid on products over an area of predetermined configuration of each product, said apparatus comprising a valve assembly, conveyor means for conveying said products in spaced succession in a path extending below said valve assembly, said valve assembly comprising a hollow housing and valve element therein, discharge orifice means communicating between the interior and exterior of the housing and extending longitudinally along the bottom thereof, said valve element being mounted for rotary movement to various predetermined positions, said valve element having means for opening varying portions of said discharge orifice means in response to movement of said valve element to said various predetermined positions, means for actuating said valve element through a complete cycle of movement including said various positions thereof in timed relation to the passage of each of said successive products below the valve assembly, said discharge orifice means comprising a plurality of discharge openings each adapted to discharge the fluid in a thin stream, means for mounting said valve housing for horizontal reciprocating movement, and means for reciprocating said housing for causing each of said discharged streams of fluid to be deposited on the product in the form of a wavy line.

14. An apparatus for depositing a viscous fluid on products over an area of predetermined configuration of each product, said apparatus comprising a valve assembly, conveyor means for conveying said products in spaced succession in a path extending below said valve assembly, said valve assembly comprising a hollow housing having a substantially cylindrical interior surface, said housing having a longitudinal axis extending in a direction perpendicular to said path, a cylindrical valve element within the housing and coaxially of the latter, the external diameter of said valve element being approximately equal to the internal diameter of said housing so as to provide a substantially sealing engagement between the exterior cylindrical surface of the element and the interior surface of the housing, discharge orifice means communicating between the interior and exterior of the housing and extending longitudinally along the bottom thereof in a direction parallel to the axis thereof, said valve element having a longitudinal recess in the exterior surface thereof, said recess having a length at least equal to the length of said discharge orifice means, said element being mounted for rotary movement about its axis to a closed position and to various predetermined open positions, said recess being contoured so as to communicate with various respective predetermined portions of said discharge orifice means in response to movement of said valve element to said open positions, said housing having an inlet opening and an outlet opening for said viscous fluid, said openings communicating through said recess with each other and with said discharge orifice means when said valve element is in said open positions, said valve element having conduit means extending transversely therethrough and communicating with both of said openings at least during the period when said valve element is in a closed position, means for actuating said valve element through a complete cycle of movement including said various positions thereof in timed relation to the passage of each of said successive products below the valve assembly, and means for forcing said viscous fluid into said inlet opening and through said housing and out of said outlet opening continuously without interruption during a plurality of successive cycles of movement of said valve element.

References Cited in the file of this patent

UNITED STATES PATENTS

| | | |
|---|---|---|
| 1,258,322 | Doellinger | Mar. 5, 1918 |
| 1,364,827 | Behr | Jan. 4, 1921 |
| 1,402,287 | Dilger | Jan. 3, 1922 |
| 1,771,117 | Greer | July 22, 1930 |
| 1,843,859 | Baker | Feb. 2, 1932 |
| 2,364,264 | Yeomans | Dec. 5, 1944 |
| 2,424,949 | White | July 29, 1947 |
| 2,451,096 | Kooman | Oct. 12, 1948 |
| 2,660,148 | Fogg | Nov. 24, 1953 |